Figure 1:
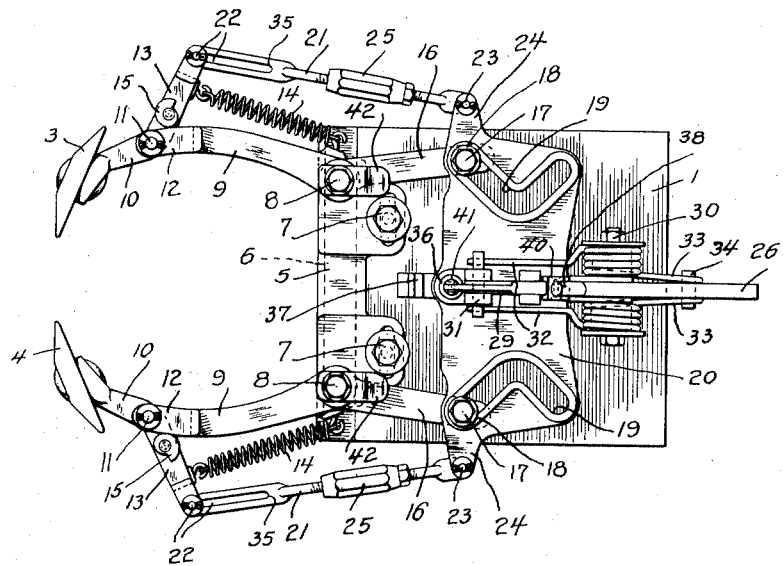

C. M. SLOMAN.
TIRE BUILDING APPARATUS.
APPLICATION FILED JUNE 7, 1919.

1,415,724.

Patented May 9, 1922.

Inventor.
C. M. Sloman.
By his Attorney.
Ernest Hopkinson

UNITED STATES PATENT OFFICE.

CHERI M. SLOMAN, OF DETROIT, MICHIGAN.

TIRE-BUILDING APPARATUS.

1,415,724.     Specification of Letters Patent.     Patented May 9, 1922.

Application filed June 7, 1919. Serial No. 302,541.

*To all whom it may concern:*

Be it known that I, CHERI M. SLOMAN, a citizen of the United States, residing at Detroit, county of Wayne, and State of Michigan, have invented certain new and useful Improvements in Tire-Building Apparatus, of which the following is a full, clear, and exact description.

This invention relates to tire building apparatus, and is of particular utility when embodied in the construction of what is known to the trade as a "stitching" machine, for rolling into place the necessary number of fabric plies or components of a tire carcass, although I contemplate the use of my improvements in any field for which they may be adapted by their nature.

Throughout the following specification I use the expression "stitchers" without technical limitation as a convenient brief term to designate any devices for pressing tire components toward the surface with which they are to conform, and the specific form of such devices may be widely modified.

An important object of my invention is to provide mechanism so organized as to act automatically to present the stitchers substantially at right angles to the tire fabric at all regions of their operations about the core, and especially at the portions of the tire bounded by the bead and the substantially vertical section of the side wall, in contradistinction to the usual practice which demands that operators shall give their closest attention at such portions, and practically dispense with automatic action upon those parts.

Another important object of my invention is to organize the stitcher operating mechanism so that it is self-acting upon the operation of a single lever, acting reciprocally, instead of revolubly, inasmuch as I have found such reciprocal movement to be more natural for the operator, and to afford greater delicacy of manipulation in treatment of the components with the nicety that is often required.

I provide further important improvements in the means for changing the angle of the stitchers with respect to the lever arms, and for delimiting the range of movement of the stitcher parts relative to their supporting arms, my novel mechanism for this purpose being capable of positive and very accurately fixed adjustments.

Still other improvements comprise the provision of retracting devices acting automatically to clear the stitching devices from the work and to return all the instrumentalities to normal inoperative position steadily upon release of forward pressure upon the operating handle, so that the operator is concerned merely with the forward actuation of the devices, which is facilitated by the yielding resistance of the retracting member, the latter preferably being a spring, so that when necessary to release the stitchers, the entire attention of the operator can be devoted to the inspection or manipulation of the tire components.

I have also provided a latch constituting means for retaining the operating instrumentalities fixed in a predetermined relative position during operation, and means, situated for convenient grasp by the hand of the operator as he holds the actuating handle, to release the retaining latch and permit free action of the retracting spring.

Special attention has been paid by me to the arrangement of parts which must be adjusted at regions of unusual accessibility, and also to provide adjusting devices of a character permitting ready manual operation, without the necessity for tools, the various working parts being also of very solid construction and ample bearing surfaces, to increase their availability for treating very large tires.

The various features of my invention will be illustrated and described fully in the accompanying drawings and specification and pointed out in the claims.

Figure 2:
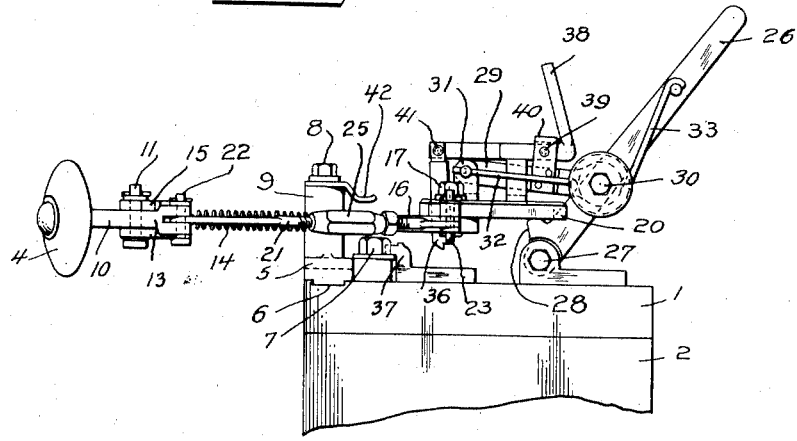

In the drawings,

Fig. 1 is a view in plan of a tire building machine in the construction of which my improvements have been embodied; and Fig. 2 is a view of the same machine in side elevation.

In the embodiment of my invention selected for illustration and description to permit ready and complete understanding of my improvements, the part designated by the reference numeral 1 is the main support for the operating instrumentalities of the machine, and this support may be of any suitable form and material, being herein shown as a table consisting of a rectangular metal block or plate mounted upon a suitable base 2, the primary object of my improved mechanism being to provide for the support and operation of such working devices as the "stitchers" shown at 3 and 4 respectively, these being shown as of well-known form, although any working device capable of use in such a machine may be employed. The table 1 may have the usual movements relatively to the base 2, through connections not shown.

As one convenient form of carriage or subsidiary support for the working devices I have shown a head 5, having a tongue and groove connection, indicated at 6 in Fig. 2, with the table 1, permitting lateral adjustment, with means shown at 7 for bolting the carriage 5 in adjusted position upon the table, and at 8 I have shown posts, of which only the nut heads appear in the drawings, serving as upright bearings for arms 9 which carry stitcher levers 10, the latter being secured by pins 11 in forked ends 12 of the said arms 9. The stitcher levers 10 may be of any suitable construction, and are herein shown as bell-crank levers, whose arms are formed at a rather flat angle, preferably, in order to present the stitcher members 3 and 4 properly to perform their appointed work.

This arrangement also causes the arms 13 of the stitcher levers to extend rearwardly and outwardly in such fashion as to furnish convenient points of attachment for certain operating adjuncts, including coil springs 14 extending from the levers 13 to the levers or arms 9 respectively, and tending normally to hold the stitcher devices 3 and 4, relatively to the arms 9, at a position which may be controlled by setting the snail cam 15, which, when set, furnish a positive stop, limiting the outward range of movement of the stitchers with relation to the arms.

In accordance with an important object of my invention, I provide means for a predetermined relative adjustive movement of the stitchers angularly during the performance of a complete cycle of their operation upon a tire body or carcass, changing simultaneously, and, as nearly as practicable, at the same rate as the slope of the core surface changes, this constituting a notable improvement over the operation of standard solid arm stitchers, in which the angle does not change to any appreciable extent, so that at certain regions the stitchers have a tendency to slip, badly scoring the carcass fabric.

Any suitable means may be adopted to accomplish this purpose, and as one convenient structure therefor I have shown arms 16, or parts of the lever arms 9, extending rearwardly over the table 1 and provided with studs 17, having rollers 18 working in cam grooves 19 of a cam plate 20 which extends across the central portion of the table 1, and constitutes the main operating member of the machine.

Connections are also provided, preferably between the member 20 and the arms 13 of the stitcher levers, and as a convenient form of such connections to carry into effect this portion of my invention, I have shown struts 21 each preferably having a pin and slot connection at 22 with its co-operating arm 13, and pivotal connections at 23 with lugs 24 upon the cam plate 20, these struts preferably being adjustable, as by turnbuckles 25, by which the time and extent of throw of the levers 13 can be regulated.

The movement of the operating member 20 is of a reciprocating character in a substantially horizontal plane, and any suitable means may be provided to effect this right line movement. For this purpose I have shown at 26 an actuating member comprising a rock arm or lever mounted pivotally upon a bearing 27 mounted upon the table 1, the lever 26 swinging in the vertical plane, of right line movement of the member 20, and preferably having a knuckle 28 serving to support the under-surface of the plate 20.

A link 29 is extended forward from a bearing 30 upon the lever 26, to a forked post 31 at the central part of the plate 20, from which post springs 32 extend rearwardly to the bearing 30 on the lever arm 26, around which bearing they are coiled and have upwardly extending portions 33 bearing against a stud 34, so that their normal tendency is to throw the lever 26 backward into substantially the position illustrated, bringing all the parts into the full line position in the figures, with the stitchers separated as indicated.

I prefer to provide means acting automatically to hold the operating member 20 in a predetermined advanced position against retractive movement of the springs 32, and for this purpose have shown at 36 a latch to be engaged with a keeper 37, mounted on the table 1. To release this latch I have shown a handle 38 fulcrumed at 39 upon a post 40, carried by the arm 29, and connected pivotally at 41 with the latch member 36, this releasing handle being so positioned that it will extend upward in convenient proximity to the actuating lever 26, when in its forward position, so that the operator can grasp the handle 38 and trip the latch 36 while still holding the actuating lever 26, leaving his hand in position on the latter to retard retractive movement thereof under the action of the springs 33.

The operation of my improved mechanism is as follows:—

The various instrumentalities being in the position illustrated in the drawings, and a tire core with the components to be applied thereto having been brought into position as usual, the operator will grasp the actuating lever 26 and move the same forward, thereby causing the arm 29 to move the cam plate or operating member 20 forward, carrying with it the struts 21, which are permitted a limited forward movement freely by the pin and slot connection 22. During this portion of the movement forward of the member 20, the rollers 18 upon the studs 17 of the arms 16 are moved inward toward the apex of the V-shaped slot in the plate 20 on each side and swing the arms 9 outward about the pivots 8, causing separation of the stitcher devices 3 and 4, which latter move as a unitary structure with the arms 9, for the reason that the stitcher supporting levers 10 are held solidly thereagainst by the action of the springs 14, which draw the lever arms 13 inward as far as permitted by the snail cam 15.

At or about the time that the rollers 18 reach the apices of the V-shaped cam slots, which position marks the outermost separation of the stitchers, the struts 21 reach a forward position where the pin on each lever 13 is engaged by the inner wall 35 of the slot in its strut 21, and as the operating member 20 continues its forward movement, and the rollers 18 traverse the other leg of the V-shaped cam slots 19, which causes outward movement of the lever arms 16 and approaching movement of the arms 9, the struts 21 force the levers 13 forward and rotate them about the pivots 11, causing the stitcher levers 10 to move the stitchers respectively at a relatively greater speed, causing a change in angularity of the working position of the stitchers which causes them to conform to the slope of the core surface under treatment at this stage of the operation, thus avoiding any tendency of the stitchers to slip and score the carcass fabric injuriously.

During the above recited forward movement of the operating member 20, the latch 36 has been carried forward until it has ridden over the keeper 37, and if the operator desires to remove his hand from the actuating lever 26 at this stage of the operation, as may be of advantage at times to permit freedom in manipulation of the tire core and tire components, the latch 36 will engage the keeper 37 and prevent retraction of the operating parts by the springs 32, until release of the latch 36. Such release will be effected usually by the operator when he has moved the actuating lever 26 forward to the full extent of its movement, at which position its motion will be checked by the buffer springs 42, and at that stage the actuating lever 26 will stand in proximity to the handle 38, which may be grasped by the operator to trip the latch 36, by raising it, and then the action of the spring members 32, 33 will gradually force the lever 26 backward and cause withdrawal of the operating member 20 as the operator eases off the pressure of his hand against the lever 26.

During such retractive movement, the struts 21 are withdrawn and permit the springs 14 to swing the stitcher levers 13 and 10, with the stitchers, away from each other first, and thereafter the rollers 18 moving toward the apex of the V-shaped cam slots in member 20, cause separative movement of the arms 9 until the apex of the cam slot is reached by roller 18 on each side, after which the travel of the rollers 18 away from the apex of each cam slot causes inward movement of the arms 9 and stitchers 3 and 4 to the original position illustrated in the drawings.

Accordingly, the entire cycle of movements above described is accomplished automatically by a simple direct forward movement by the operator of a hand lever 26 in natural fashion, effecting thereby all necessary changes in the relative angular position of the stitchers, and the stitching operation having been accomplished, the reverse cycle is effected automatically by spring action, simply requiring a slight retarding co-operation by the hand of the operator, without need for concentration of his attention.

Having illustrated and described my invention thus fully, and suitable means by which the same may be carried into effect, I wish it to be understood that I do not limit myself to the specific structure and materials selected for illustration and description, nor in general do I limit myself otherwise than as set forth in the claims read in connection with this specification.

What I claim as new and desire to secure by Letters Patent is:—

1. In a tire building machine, in combination, stitching devices, a movable support therefor, mechanism for moving said stitching devices relative to said support including a unitary member shiftably mounted on said support, and a plurality of sets of actuating connections between said member and each of said stitching devices arranged to impart a compound movement such that they maintain a substantial angle to the surface of a core to each stitching device throughout a stitching operation whereby scoring of the fabric is prevented.

2. In a tire building machine, in combination, stitching devices, a reciprocable carriage for said stitching devices, a lever supporting each of said stitching devices, a second lever supporting said first mentioned lever, and a member connected operatively and independently to each of said levers for differentially moving the same to present the stitching devices at a substantial angle to the core and thereby prevent scoring of fabric throughout a stitching operation.

3. In a tire building machine having a support, stitching devices mounted on said support for setting tire components in position in a tire carcass, and operating mechanism for said devices comprising an operating member reciprocable toward and away from said devices in a substantially horizontal plane, and means connecting said operating member and stitching devices acting upon substantially right line movement of said operating member to cause presentation of said stitcher devices for engagement with differently positioned portions of the work at a working angle conforming automatically with said differences of position, and manually operable actuating means for said operating member.

4. In a tire building machine having a support, stitching devices mounted on said support for setting tire components in position in a tire carcass, operating mechanism for said devices comprising an operating member reciprocable toward and away from said devices in a substantially horizontal plane, and means connecting said operating member and stitching devices acting upon substantially right line movement of said operating member to cause presentation of said stitcher devices for engagement with differently positioned portions of the work at a working angle conforming automatically with said differences of position, manually operable actuating means for said operating member, and retracting means tending normally to hold said instrumentalities out of operative position.

5. In a tire building machine having a support, stitching devices mounted on said support for setting tire components in position in a tire carcass, operating mechanism for said devices comprising an operating member reciprocable toward and away from said devices in a substantially horizontal plane, and means connecting said operating member and stitching devices acting upon substantially right line movement of said operating member to cause presentation of said stitcher devices for engagement with differently positioned portions of the work at a working angle conforming automatically with said differences of position, manually operable actuating means for said operating member, retracting means tending normally to hold said instrumentalities out of operative position, means to retain said instrumentalities in an advanced operative position, and a releasing device for said retaining means.

6. In a tire building machine having a support, stitching devices mounted on said support for setting tire components in position in a tire carcass, operating mechanism for said devices comprising an operating member recipocable toward and away from said devices in a substantially horizontal plane, and means connecting said operating member and stitching devices acting upon substantially right line movement of said operating member to cause presentation of said stitcher devices for engagement with differently positioned portions of the work at a working angle conforming automatically with said differences of position, manually operable actuating means for said operating member, retracting means tending normally to hold said instrumentalities out of operative position, means to retain said instrumentalities in an advanced operative position, and a manually operable releasing device.

7. In a tire building machine, in combination, stitching devices, a reciprocable carriage for said stitching devices, pivotally connected levers for sustaining each of said stitching devices and supported by said carriage, a rectilinearly movable member for differentially moving said levers, and manual means for shifting said member relative to said carriage.

8. In a tire building machine, in combination, stitching devices, a reciprocable carriage for said stitching devices, a lever supporting each of said stitching devices, a second lever supporting said first mentioned lever, a member connected operatively and independently to each of said levers for differentially moving the same, means for moving said member, and means including a spring for normally holding the first mentioned lever in predetermined relation with the second mentioned lever during a portion of the stitchers' movement.

9. In a tire building machine, in combination, stitching devices, a movable support therefor, mechanism for moving said stitching devices relative to said support including a member, a plurality of connections between said member and each of said stitching devices for imparting a compound movement thereto whereby a desirable angular relation to a core may be maintained throughout a stitching operation, and a manually operable actuating lever for said member having a swinging movement in a vertical plane parallel with the line of movement of said member.

10. In a tire building machine having a support, stitcher mechanism mounted upon said support, an operating member having a right line operating movement upon said support to cause presentation of said stitcher mechanism for engagement with differently positioned portions of the work at a working angle conforming automatically with said differences of position, a manually operable actuating lever having a swinging movement in a vertical plane parallel with the line of movement of said operating member and connected actuatively therewith, and a spring tending normally to retract said instrumentalities after right line operation of said operating member by said actuating lever.

11. In a tire building machine having a support, stitcher mechanism mounted upon said support, an operating member and means connecting said member operatively with said stitcher mechanism, a manually operable actuating lever having a link mounted pivotally thereon and connected actuatively with said operating member, and a spring coiled about the pivotal connection between said lever and link and tending normally to maintain said lever, link, operating member and stitcher mechanism in a retracted, inoperative position.

12. In a tire building machine having a support, stitcher mechanism mounted upon said support, an operating member therefor, an actuating lever linked to said operating member, a retracting spring to return said parts to normal inoperative position, a latch and keeper co-operating to restrain said retractive movement, and a handle to trip said latch and permit completion of said retractive movement.

13. In a tire building machine having a support, stitcher mechanism, an operating member and a manual actuating lever mounted upon said support, a latch to restrain said actuating lever upon return from operating movement, and a handle to trip said latch, said handle being positioned at a region permitting its grasp by the hand of the operator at or near the forward extreme of operative movement of said actuating lever.

14. In a tire building machine having a support, stitcher mechanism comprising stitcher arms mounted pivotally upon said support, an operating member comprising a cam plate slotted to receive a part of said stitcher arms operatively, and having a right line movement to operate the same, and an actuating lever swinging in the vertical plane of said right line movement and linked actuatively to said cam plate.

15. In a tire building machine having a support, a table movable upon said support, a head adjustable upon said table and provided with pivot posts, stitcher arms mounted rotatably upon said posts and having arm portions with rollers and bearings for stitcher levers respectively, stitcher levers mounted in said bearings and having stitcher devices near one end and position controlling devices near the other end respectively, springs connecting said arms and levers, to cause unitary movement thereof at times, an operating member comprising a cam plate having V-shaped grooves in which said arm rollers are engaged, struts having respectively pin and slot connections with said stitcher levers and adjustable connections with said cam plate, to permit the latter to cause rotative movements of said stitcher levers relatively to said arms against the action of said springs at times, an actuating lever fulcrumed upon said table and having a link mounted rotatively thereupon, connecting said lever with said cam plate, a spring extending from said cam plate, to said lever and coiled about the bearing of said link, to cause normal retractive movement of said lever and said operating cam plate, a retaining latch and keeper, the former being carried by said cam plate and the latter being carried by said table, and a tripping handle mounted pivotally upon said cam plate in position for manual engagement by the hand of the operator when employed in moving said actuating lever through the forward portion of its path for freeing the keeper from the latch.

16. In a tire building machine, in combination, a carriage, a stitching device, a lever directly supporting said stitching device, a member movably mounted on said carriage, independent actuating connections between said member and said lever one of which connections is fulcrumed on said carriage, and means for moving said member to maintain the stitchers at a substantial angle to the core throughout a fabric laying-on operation whereby scoring of the fabric is prevented.

Signed at Detroit, county of Wayne, State of Michigan, this 27th day of May, 1919.

CHERI M. SLOMAN.